March 1, 1966   L. J. GROSSWILLER, JR., ETAL   3,237,884
PNEUMATIC SYSTEM CARRIER CONSTRUCTION
Filed July 26, 1963   3 Sheets-Sheet 1
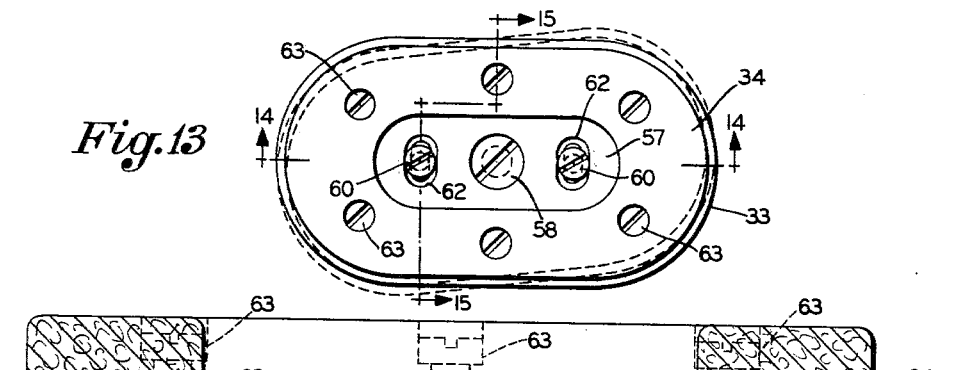
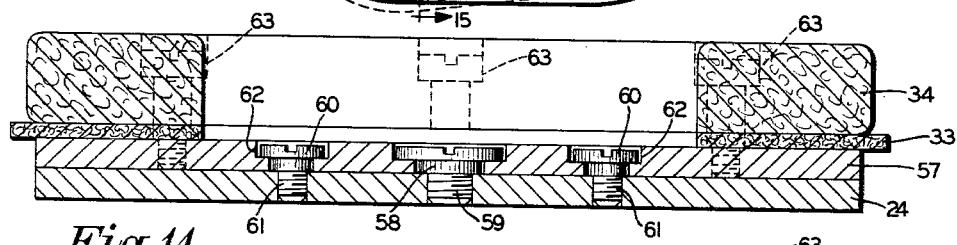
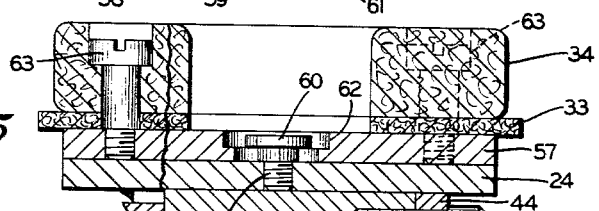
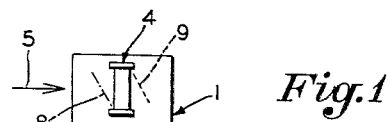
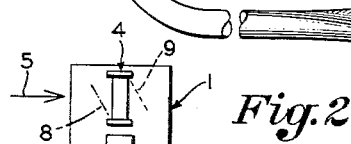
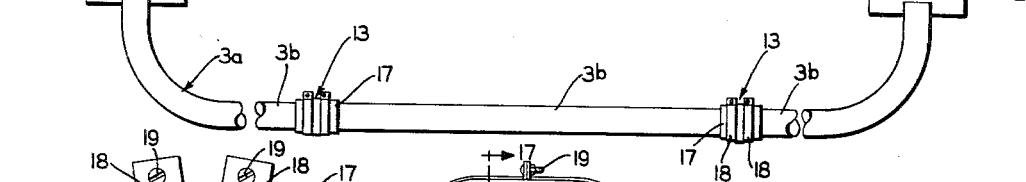
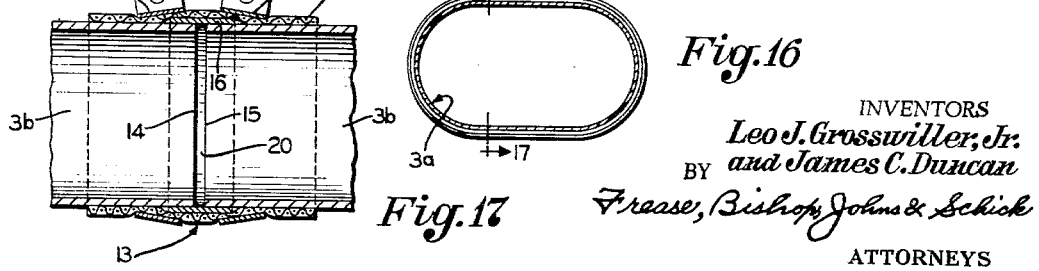
INVENTORS
Leo J. Grosswiller, Jr.
BY and James C. Duncan
Frease, Bishop, Johns & Schick
ATTORNEYS March 1, 1966  L. J. GROSSWILLER, JR., ETAL  3,237,884
PNEUMATIC SYSTEM CARRIER CONSTRUCTION
Filed July 26, 1963  3 Sheets-Sheet 2

INVENTORS
Leo J. Grosswiller, Jr.
BY and James C. Duncan
Frease, Bishop, Johns & Schick
ATTORNEYS

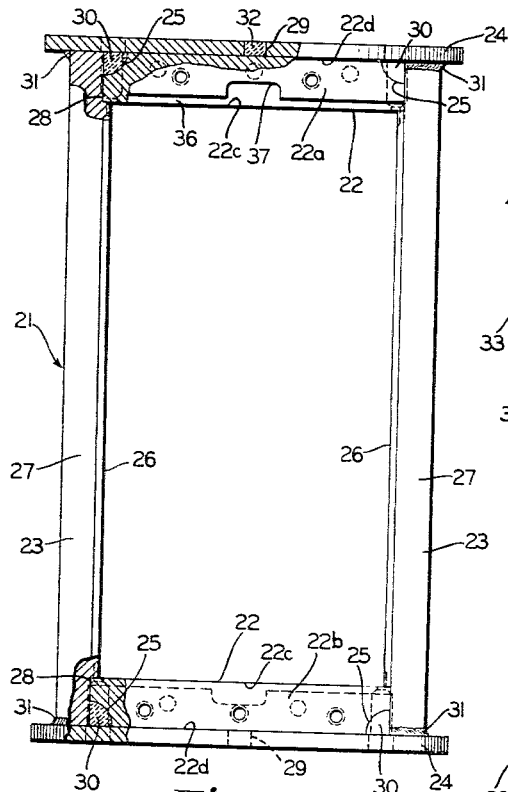
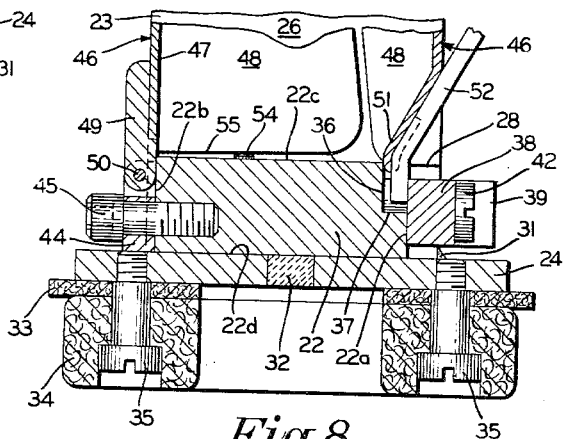
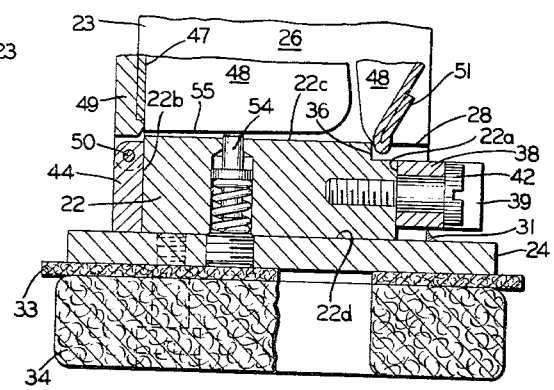
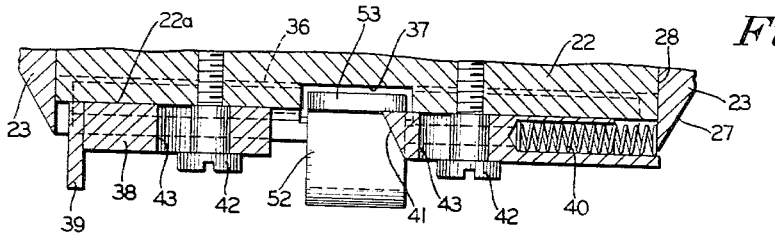
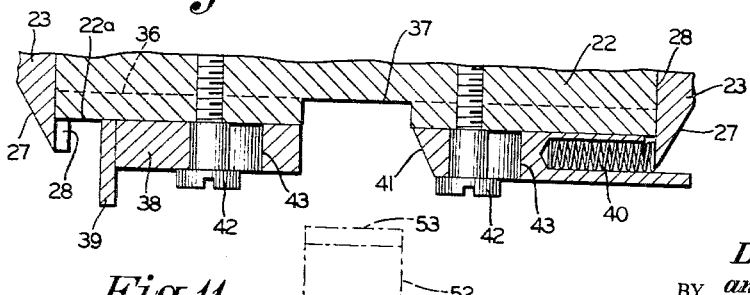

United States Patent Office 3,237,884
Patented Mar. 1, 1966

3,237,884
PNEUMATIC SYSTEM CARRIER CONSTRUCTION
Leo J. Grosswiller, Jr., East Canton, and James C. Duncan, North Canton, Ohio, assignors to Diebold, Incorporated, Canton, Ohio, a corporation of Ohio
Filed July 26, 1963, Ser. No. 297,751
10 Claims. (Cl. 243—34)

The invention relates to pneumatic systems in which a carrier is moved rapidly by air pressure or vacuum through a conveyer tube between one station at one end and another station at the other end of the conveyer tube; and more particularly the invention relates to captive carrier constructions for such pneumatic tube systems, to tube constructions for such systems, and to cooperative relationships between such captive carrier and tube constructions.

Pneumatic tube carrier systems have been used advantageously for conducting banking services because of the rapidity with which banking transaction media (such as deposit and withdrawal components which may include coin, paper money, checks, deposit slips and other similar articles) may be moved from a teller's console or station within a bank building at one end or terminal of the pneumatic tube to a customer's station or kiosk at the other end or terminal of the pneumatic tube remote from the teller's console and accessibly located for walk-up or drive-up banking transactions; and in which two-way oral and visual communication is established and maintained between the teller's console and the kiosk.

Equipment for conducting such banking services has included television cameras and receivers for establishing the two-way visual communication at the teller's console and kiosk, and is known as television banking equipment.

There have been problems involved in the construction, operation and use of television banking equipment related to the rapid pneumatic tube movement of a carrier between the terminal stations, related to the position of a captive carrier as delivered at each of the terminal stations, and related to the stopping of the carrier at the stations.

A relatively large carrier is required having a payload-containing compartment or chamber, large in size, and preferably elongated between the ends of the carrier, and preferably generally rectangular in cross section; so that the chamber can accommodate deposit slips, bank checks or other similar papers, bank books and paper money, and also coin, either loose or in rolls. The large sized chamber also is required because the volume of banking transaction media conveyed for any one banking transaction may vary widely from the volume of banking transaction media conveyed for any other banking transaction.

It is preferred that a captive carrier be used, particularly to prevent a customer from removing the carrier from the pneumatic tube at the kiosk. Otherwise, the customer may fail to replace the carrier upon removal, and thus render the equipment temporarily inoperative.

The pneumatic tube normally terminates in an upright terminal portion at each station. A captive carrier moving through such tube thus presents one carrier end uppermost at one station and the other carrier end uppermost at the other station. These conditions require the carrier to have an access opening for the payload-compartment, preferably closed by a hinged door on each side of the carrier, one door for use at one station and the other for use at the other station. The swinging edge of the door used at a particular station should swing toward and away from the uppermost end of the carrier at such station, with the hinge means for the door located adjacent the lowermost end of the carrier at such station.

A further complication arises concerning the carrier access doors. Installation conditions for one installation may require orientation of the location of the access opening at the kiosk (facing east for example) to be the same as the orientation of the access opening at the teller's console (also facing east); while for another installation the kiosk access opening may face west with the teller's console opening facing east. Thus, the captive carrier and pneumatic tube must be constructed and interrelated such that the carrier will present a bottom hinged door for access at either station regardless of different orientation of the access openings at the stations for different installations.

Next, problems are presented in stopping a large sized captive carrier provided with hinged doors at the terminal stations, particularly when such carrier is heavily loaded with coin and conveyed at high speed through the pneumatic tube. Heretofore, regardless of the nature of bumpers, cushions and other shock absorber and deceleration means used at the terminal stations, the repeated shocks of repeatedly stopping the carrier at the stations tend to physically break down the carrier and its components, and particularly the hinge and latch mechanisms for the carrier doors.

Another difficulty encountered involves the distance between the terminal stations. A carrier having a payload compartment generally rectangular in cross section preferably has oval-shaped heads which seal within and slide or shuttle through a pneumatic tube also oval in cross section. The desired orientation of the access openings for the stations may be taken care of by forming a twist in the oval-shaped pneumatic tube. However, there are limitations as to the amount of twist that may be formed in a given length of tube. The distance between the stations may be such, using prior constructions, that it is impossible to provide the required amount of twist in the available distance to satisfy the orientation requirement.

Furthermore, since the carrier is pneumaticaly conveyed through the tube, and since any installation may require a different tube length than any other installation, the tube should be installed in short lengths or sections with sealed joints between adjacent sections. Tube sections normally are made of sheet metal and while sealed joints may be formed by welding, welded joints are difficult and expensive to form in the field and they do not provide for ready access for repairs if required. Thus, the provision of satisfactory sealed joints, eliminating welded joints, between pneumatic tube sections which can be installed easily and which are accessible readily for repair, has presented a further problem in the art.

Accordingly, it is a general object of the present invention to provide new pneumatic system carrier and tube constructions which satisfy all of the manifold requirements and solve the problems and avoid the difficulties indicated.

Furthermore, it is an object of the present invention to provide a new pneumatic system carrier construction which minimizes damage to the carrier and its component parts incident to repeatedly stopping at tube terminals a rapidly moving relatively large heavily loaded captive carrier provided with hinged doors.

Also, it is an object of the present invention to provide new pneumatic system carrier and tube constructions satisfying the indicated objectives in which the carrier will present a bottom hinged door for access at a station at either upright tube terminal section regardless of different orientation of the location of access openings at the stations for different installations.

Moreover, it is an object of the present invention to provide new pneumatic system carrier and tube constructions which enable any desired orientation of the location of access openings at the tube terminal stations to be established, and which enable the required twist to be formed in a substantially shorter tube length of a pneumatic tube, oval in cross section, to satisfy the orientation requirement, than has been possible in prior constructions.

Also, it is an object of the present invention to provide new pneumatic system tube constructions satisfying the indicated objectives, and which may be formed of sheet metal tube sections with readily installed accessible sealed joints between adjacent tube sections.

Finally, it is an object of the present invention to provide new pneumatic system carrier and tube constructions which eliminate difficulties heretofore encountered in the art; eliminate assembly, maintenance and repair problems heretofore involved; avoid damage to the carrier and its components resulting from repeated and continued use of the equipment; achieve the stated objects in a simple, effective and inexpensive manner; and solve problems and satisfy needs existing in the art.

These and other objects and advantages apparent to those skilled in the art from the following description and claims may be obtained, the stated results achieved, and the described difficulties overcome, by the apparatus, combinations, parts, elements, subcombinations, arrangements, constructions, and interrelations between components, which comprise the preset invention, the nature of which is set forth in the following general statement, preferred embodiments—illustrative of the best modes in which applicants have contemplated applying the principles—are set forth in the following description and shown in the drawings, and which are particularly and distinctly pointed out and set forth in the appended claims forming part hereof.

The nature of the improved pneumatic system carrier and tube constructions may be stated in general terms as including in a pneumatic carrier system of a type in which a carrier tube connects a pair of stations, and in which a preferably captive carrier is shiftable in such tube between the stations; a carrier tube comprising preferably sheet metal tube sections having sealed joints between abutted end portions of adjacent sections; the sealed joints each comprising a metal sleeve encircling and overlapping abutted tube section end portions, flexible sealing tape means surrounding and overlapping said sleeve and abutted tube section end portions, and clamp means pressing the sealing tape means against the sleeve and abutted tube section end portions; a carrier including a plurality of doors hinged one each to each end of the carrier, the carrier having accelerator disc and cushion means fixed to one of its ends and having accelerator disc and cushion means on its other end, said accelerator disc and cushion means preferably swiveled on its other end, said accelerator disc and cushion means and the cross section of the carrier tube being generally oval in shape, and there being selectively a twisted section in said carrier tube intermediate the stations; the carrier including spaced side column members having inner faces and ends, and spaced base plate means joined with the column members extending between the inner faces and across the ends of the column members to provide a stable, rigid, integral, elongated, box-like, rectangular carrier shell open at each side; the base plate means preferably being mortised into the inner faces of the column members adjacent the column ends, end portions of the base plate means preferably being welded directly to mortised end portions of the column members, and other portions of the base plate means being preferably welded to the ends of the column members; the base plate means comprising first and second base plate means each having two edge faces and an inner compartment-forming face; first door means hinged at one end to said first base plate means by hinge means mounted on one edge face of said first base plate means, second door means hinged at one end to the second base plate means by hinge means mounted on one edge face of said second base plate means, whereby said door means close the open sides of said rectangular shell; said door means each preferably comprising a generally flat rectangular closure wall and flange-like side walls projecting from the closure wall; said door means when closed having their side walls aligned and telescoped within the carrier shell adjacent the column member inner faces; said door means closure and side walls and said base plate inner faces forming an elongated, box-like, payload-containing compartment; the door means side walls having end edges adjacent the hinged ends of the door means, preferably spring-pressed plungers mounted in the base plate means engaging the door side wall end edges for urging the door means to open position; the door hinge means preferably being piano-type hinges including a hinge pin, each hinge pin being located below the inner face of the corresponding base plate means; latch means for each door means including a first latch slide for the first door means slidably mounted on the other edge face of the second base plate means and a second latch slide for the second door means slidably mounted on the other edge face of the first base plate means for normally holding the door means latched in closed position against the action of said spring-pressed plungers; preferably a projecting ear at the swinging edge of each door adapted to be engaged by the latch slide for such door; and each latch slide being spring-pressed to latching position and being slidably movable parallel with the swinging edge of the door latched thereby crosswise of the carrier shell.

By way of example, embodiments of the improved constructions are illustrated in the accompanying drawings forming part hereof in which:

FIGURE 1 is a diagrammatic view of a pneumatic system having oppositely oriented access openings at the terminal stations;

FIG. 2 is a view similar to FIG. 1 of a modified construction having access openings oriented in the same direction at the terminal stations;

FIG. 8 is a fragmentary vertical section of the lower end of the carrier shown in FIG. 3 taken on the line 8—8, FIG. 5;

FIG. 9 is a sectional view similar to FIG. 8 taken on the line 9—9, FIG. 5;

FIG. 10 is an enlarged fragmentary section taken on the line 10—10, FIG. 3 illustrating a door latch in latched position;

FIG. 11 is a view similar to FIG. 10 taken on the line 11—11, FIG. 7 illustrating a door latch in unlatched position;

FIG. 12 is a front view with parts broken away and in section illustrating the main frame assembly for the carrier of FIG. 3;

FIG. 13 is a view similar to FIG. 6 illustrating a modified form of carrier construction;

FIG. 14 is an enlarged section taken on the line 14—14, FIG. 13;

FIG. 15 is another section taken on the line 15—15, FIG. 13;

FIG. 16 is a cross section of an oval pneumatic tube illustrating an improved tube joint somewhat diagrammatically; and FIG. 17 is an enlarged sectional view taken on the line 17—17, FIG. 16 illustrating an improved sealed joint.

Similar numerals refer to similar parts throughout the various figures of the drawings.

Figure 3:
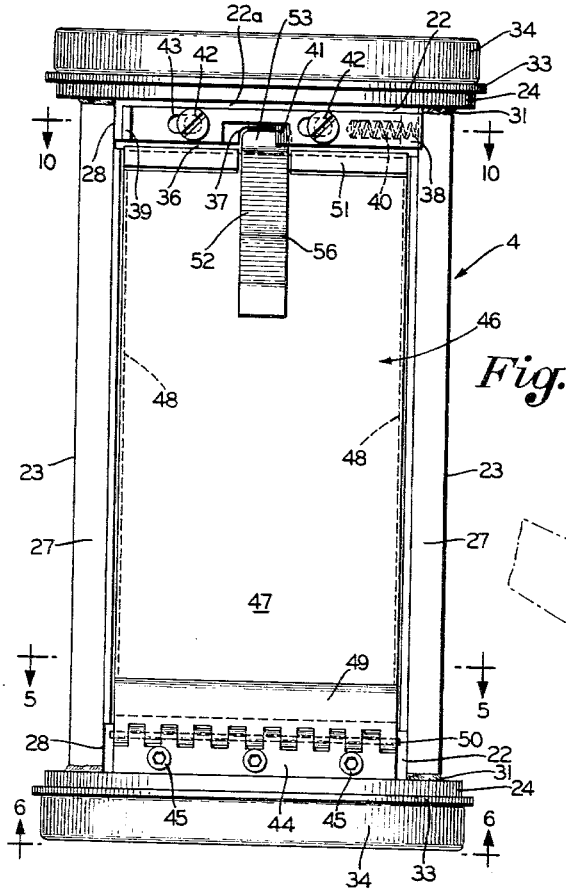
FIG. 3 is an enlarged front elevation of one form of improved carrier construction with a door latch in latched position.

Pneumatic tube carrier systems for conducting banking services are illustrated diagrammatically in FIGS 1 and 2. Each includes a teller's console or station generally indicated at 1 and a kiosk or customer's station generally indicated at 2 with a pneumatic tube generally indicated at 3 in FIG. 1, or generally indicated at 3a in FIG. 2, connecting stations 1 and 2.

A captive carrier diagrammatically indicated at 4 travels between stations 1 and 2 by air pressure or vacuum supplied to tube 3 or 3a. Carrier 4 is shown located at console 1 in FIGS. 1 and 2 and for purposes of illustration only, the same carrier 4 is also shown at kiosk 2. It is to be understood that only one captive carrier 4 will be used in any installation travelling between the stations 1 and 2.

Teller's console or station 1 normally is located at some convenient place within a bank building and the arrow 5 in FIGS. 1 and 2 indicates the location of a bank teller using the system in front of end to the left of station 1. Kiosk 2 for either of the FIGS. 1 and 2 installations may be located at a remote distance from console 1 adjacent a street, or along a sidewalk or in the outer wall of a building, or at a parking lot.

Depending upon the location of and the surroundings of kiosk 2, the customer access opening (not shown) may be oriented at a location opposite to that of console 1 in FIG. 1. That is, the customer will approach kiosk 2 in FIG. 1 from the right as indicated by arrow 6.

Under other circumstances as shown in FIG. 2, the customer may approach kiosk 2 from the left as indicated by the arrow 7, so that the customer access opening (not shown) for the FIG. 2 installation is oriented the same as that of console 1.

The uppermost end of carrier 4 in FIGS. 1 and 2 when the carrier is located at console 1 becomes the lowermost end of the same carrier located at kiosk 2. A bottom hinged teller door 8 for carrier 4 is illustrated in dot-dash lines at console 1 in FIGS. 1 and 2. This teller door 8 becomes a top hinged door when carrier 4 is located at kiosk 2 and the carrier is rendered available to a customer located at 6 or 7, but the teller door 8 is not used by a customer.

A top hinged customer door 9 is illustrated in dotted lines in FIGS. 1 and 2 at teller's console 1. The door 9 becomes a bottom hinged door when carrier 4 is located at kiosk 2, and door 9 is available to a customer located at 6 or 7.

Tubes 3 or 3a in FIGS. 1 and 2 preferably are oval in cross section as generally illustrated in FIG. 16. Somewhere between the upright terminal zones 10 and 11 of tube 3 in FIG. 1, tube 3 is provided with a 180° twist, illustrated at 12, in order that the customer door 9 of carrier 4 may be presented to a customer 6 at kiosk 2 at an access opening oppositely oriented with respect to the teller's access opening at console 1, as indicated by arrows 5 and 6.

If the access openings for console 1 and kiosk 2 have the same orientation (arrows 5 and 7 in FIG. 2), no twist is necessary in tube 3a connecting the two stations.

The access opening for kiosk 2 in FIG. 1 may be available to a customer facing the plane of the drawing, by forming a 90° twist in tube 3. The access opening at kiosk 2 may face the rear of the plane of the drawing, and a 90° twist in the other direction in tube 3 serves such arrangement. Thus, any degree of difference in orientation required by the particular limitations of any installation can be accommodated by the amount of twist formed in tube 3 from zero to 180° in one direction or the other.

The oval pneumatic tube 3 or 3a preferably is formed of sheet metal, using tube sections such as indicated at 3b in FIG. 2 with joints generally indicated at 13 between adjacent tube sections. Although no joints are illustrated in FIG. 1, it is understood that tube 3 also may be formed using tube sections of convenient length with joints 13 therebetween.

Carrier 4 shuttles between stations 1 and 2 by air pressure or vacuum supplied to tube 3 or 3a, so that joints 13 must be water-tight and air-tight. Butt-welded joints between adjacent tube sections 3b can be formed to provide water-tight and air-tight joints. The distance may vary between stations 1 and 2 with each installation and the tube normally runs underground between stations 1 and 2. The formation of welds in the field at random under-ground locations is difficult and expensive.

We have discovered that a simple and effective air-tight and water-tight or sealed joint may be formed between adjacent tube sections 3b as illustrated in FIG. 17. Adjacent ends 14 and 15 of metal tube sections 3b are aligned and held in substantial abutment. A strip metal sleeve 16 then is wrapped around the abutted ends, overlapping each tube section end 14 and 15. A number of plies of flexible sealing tape 17, such as friction tape, then is wrapped around end portions of tube sections 3b and around sleeve 16. Strip metal clamps 18 drawn tight by bolts 19 then are applied to the joint, pressing against the sealing tape 17 and overlapping the ends of metal sleeve 16. Two clamps 18 are illustrated but these may be replaced by a single wider similar clamp spanning and overlapping the ends of sleeve 16.

This arrangement forms an effective sealed joint between the ends 14 and 15 of adjacent tube sections 3b. The joint, however, can be opened readily for repair or for access to the interior of the tube in case of necessity.

Although the ends 14 and 15 of tube sections 3b have been described as being abutted, a space or clearance 20 between ends 14 and 15 is illustrated in FIG. 17. A condition can arise in which such spacing 20 occurs incident to contraction of the tube metal. However, when a spacing 20 does develop, the tube ends 14 and 15 can come and go within metal sleeve 16 without breaking the seal. Furthermore, if a metal sleeve 16 is not used, the flexible sealing material 17 can move into and out of space 20 when the interior of the tube is subjected to vacuum or pressure and may be pinched or ruptured, breaking the seal. Another function of the surrounding metal sleeve 16 is to hold the tube ends 14 and 15 positively aligned so as to avoid any internal offset shoulder resulting from misalignment which would interfere with proper carrier movement and could damage a carrier moving within the tube.

Structural stability, integrity and rigidity of the main frame or shell of carrier 4 is an important aspect of the invention. The improved carrier construction is illustrated in FIGS. 3 thru 12, FIG. 12 illustrating the carrier shell construction.

The carrier 4 should be as light in weight as possible, consistent with the strength of its components required to stand up under the shock to which the carrier is subjected every time that a rapidly moving carrier is stopped at a terminal station of the pneumatic tube system. A payload-containing, elongated, large-sized compartment generally rectangular in cross section and closed by generally rectangular doors at either side may be formed by a carrier shell consisting of end and side members forming a generally rectangular frame. The light weight, high strength requirements may be satisfied by forming such a rectangular shell from a high strength aluminum alloy.

Heretofore, pneumatic tube carriers that have been used have not had the required structural stability and integrity. The main carrier frame and components mounted thereon have failed from repeated shock forces to which such carriers have been subjected in use. Probably such failure has occurred because the end and side frame members have been improperly designed and assembled from parts too thin in section, too small in volume, and with welded or bolted joints between the carrier end and side frame members that would not stand up under repeated shock stresses and were not and could not be reinforced.

In accordance with the invention, the carrier shell generally indicated at 21 in FIG. 12 is fabricated from two base plates 22, two side columns 23 and two mounting plates 24, all preferably formed of high strength aluminum alloy material. Each base plate 22 is a thick, generally rectangular, slab-like member having a quarter-circular groove 25 formed along each corner end of one base plate face 22d.

Each side column member 23 has an elongated flat inner face 26 and tapered outer faces 27 forming a generally trapezoidal shape in cross section (FIG. 5) providing a varying cross-sectional thickness between inner and outer faces, as shown. A mortise notch 28 is formed in the flat inner face 26 of each column member 23 adjacent each column end. Each mounting plate 24 is a plate-like member thinner than base members 22 having an oval shape (FIG. 5) and being provided with one or more openings 29.

In assembling shell 21, base plates 22 and side columns 23 are held in a jig in the position shown in FIG. 12 with the ends of base plates 22 fitting in mortises 28. Welds 30 are formed (FIG. 12) filling grooves 25 with weld metal securely bonding and joining members 22 and 23 together in frame-like shell arrangement.

Mounting plates 24 then are assembled with and held in a jig in fixed position with relation to joined members 22 and 23 in the position shown in FIG. 12, and welds 31 are formed between plates 24 and the outer ends of side columns 23. Plug welds 32 also are formed in openings 29 between each mounting plate 24 and its adjacent base plate 22. Although only one plug weld 32 is shown between each pair of plates 22–24, a number of plug welds, if required, may be formed between each pair of plates 22 and 24.

The carrier shell 21 constructed as described has extreme structural stability, integrity and rigidity. The welded joints 30, 31 and 32 between the components do not transmit and are not stressed by forces tending to fracture or separate the welds by the shock forces to which the carrier is subjected in use. The heavy bases formed by members 22 and 24 will resist bending. The heavy cross-sectional shape of side columns 23 resists bending of the members as columns. Any shock force acting against either end of the frame is transmitted directly from either mounting plate 24 or base plate 22 to side columns 23 without imparting destructive stresses to welds 30, 31 and 32 because of the particular location of the welds, the abutment of plates 24 against the ends of members 23, and the mortising of the ends of base plates 22 in the ends of the side columns 23.

Figure 6:
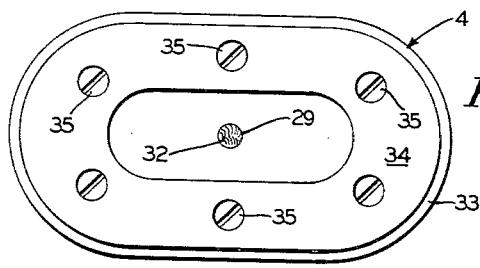
FIG. 6 is a bottom plan view of the carrier looking in the direction of the arrows 6—6, FIG. 3.

A preferably annular, leather, accelerating disc 33 and a preferably annular, felt cushion end member 34, both generally oval in shape, are mounted on each mounting plate 24 by headed and shouldered bolts 35 (FIGS. 6 and 8). The accelerating disc 33 flexes to engage, slide in and seal against the inner walls of pneumatic tube 3 or 3a for propelling a carrier through such tube by differential motive pressure.

A shouldered recess 36 is formed along one edge face 22a of each base plate 22 at the inner corner, and recess 36 is centrally enlarged at 37 for a purpose to be described. Latch slide 38 having an actuator projection 39 at one end and spring-pressed by spring 40 at the other end, and having a tapered latch portion 41 intermediate its ends, is mounted on the edge face 22a of each base plate 22 by headed, shouldered bolts 42 passing through elongated slots 43 in latch slide 38. Latch slide 38 is normally spring-pressed to latched position shown in FIGS. 3 and 10 with tapered latch portion 41 overlapping the enlarged recess portion 37. The latch slide 38 may be moved to unlatched position by engaging projection 39 with a suitable actuator (not shown) located at either of stations 1 or 2.

A hinge strap 44 is mounted against the edge face 22b of each base plate 22 by bolts 45. A door member 46 having a generally flat rectangular closure wall 47 and tapered chute-like side walls 48, provided with a hinge strap 49 at one end, is hinged to strap 44 by interfitting piano-type hinge formations on the hinge straps 44 and 49 engaged by hinge pin 50.

Referring to FIGS. 3, 4, 8 and 9, hinge pin 50 is located below the inner compartment-forming face 22c of the base plate 22 to which a door 46 is hinged.

Door 46 preferably is formed of sheet metal, bent inward and folded over at 51 at the swinging edge of the door. A V-shaped runner-like strip member 52 is mounted centrally of the swinging edge on the outer face of door closure wall 47. An ear 53 projects from strip member 52 beyond the swinging edge of the door and is adapted to be received in enlarged recess portion 37 and to be engaged by tapered latch portion 41 of latch slide 38 when door 46 is in closed position and latch slide 38 is in latched position.

Figure 4:
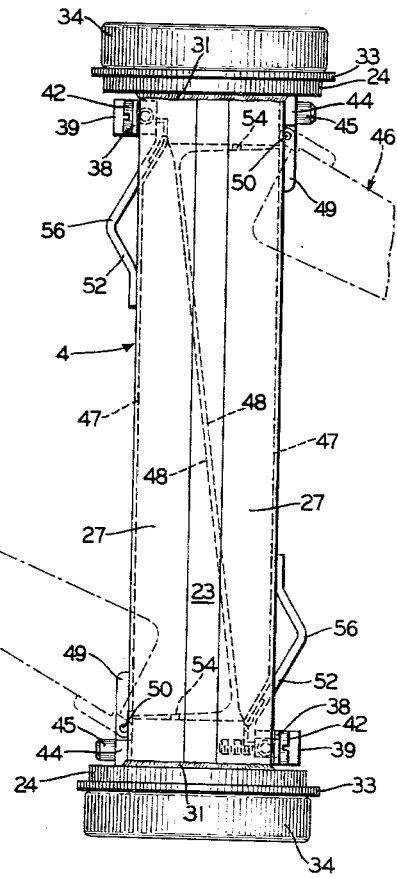
FIG. 4 is a side elevation of the carrier shown in FIG. 3.

Referring to FIG. 4, one door 46 is provided for each side of the carrier shell. Relating the carrier 4 as shown in FIG. 4 to the diagrammatically illustrated carrier 4 at teller's console 1 in FIGS. 1 and 2, the left-hand door in FIG. 4 is the bottom-hinged teller's door 8 of FIGS. 1 and 2, and the right-hand door of FIG. 4 is the top-hinged customer door 9 of FIGS. 1 and 2.

Spring-pressed plungers 54 are mounted in each pair of base and mounting plates 22 and 24, with a plunger 54 projecting inward from the inner face 22c of such base plate to engage the lower end 55 of each chute side wall 48 of the door 46 hinged to such base plate. Spring-pressed plungers 54 (FIGS. 6 and 9) impart opening movement to and normally urge the door 46 engaged thereby to open position such as illustrated by dot-dash lines in FIG. 4. The latch slide 38 when in latched position with a door latched thereby in closed position holds such door closed against the pressure of spring-pressed plungers 54. In this manner, when a carrier 4 is located at a station 1 or 2 opposite the access opening for that station, actuation of a selected latch slide 38 by suitable means will release one of doors 46, and such door will spring to an open position as shown in dot-dash lines in FIG. 4.

Figure 5:
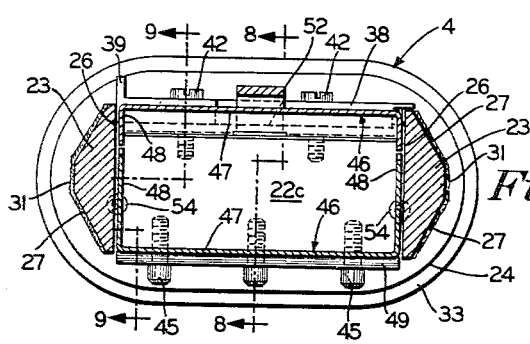
FIG. 5 is a plan sectional view of the carrier taken on the line 5—5, FIG. 3.
Figure 7:
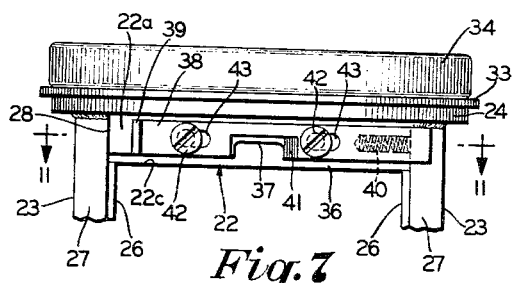
FIG. 7 is a fragmentary view similar to a portion of FIG. 3 illustrating a door latch in unlatched position.

When both doors 46 are held in closed position by latch slides 38 (FIGS. 3, 4 and 5), the free edges of the tapered side walls 48 of the doors are aligned (FIG. 4) and the side walls 48 of the doors lie in the same plane at each side of carrier 4 (FIG. 5). Thus, the side walls 48 and closure walls 47 of the two doors 46 form four sides of a box-like, payload-containing, elongated compartment for receiving banking transaction media, and the ends of such compartment are formed by the base plates 22 which present inner compartment-forming faces 22c.

Another important aspect of the invention involves the characteristics of the construction of the payload-containing compartment formed as described. Since faces 22c of the base plates 22 provide the end surfaces of the compartment, any heavy article contained within the compartment, such as coin, strikes or reacts directly against the surface 22c of one of heavy base plates 22 when the carrier is stopped at a terminal 1 or 2. This construction relieves components of the doors 46 and particularly the hinge pins 50 from shock stresses incident to the inertia of the contained payload and the stopping of carrier movement.

Stress imparted to the hinge pins 50 when carrier movement is stopped is of relatively low magnitude because only the weight of the door is involved. Such stress is distributed throughout the length of hinge pins 50 because of the piano-type hinge formations used. Further, the shock loads originating from the mass of the doors are transmitted directly to the heavy base plates 22 through the hinge straps 44 which are mounted directly on the base plates 22.

The location of the hinge pins 50 below the inner compartment-forming faces 22c of the base plates 22 and the use of interfitting piano-type hinge formations on the hinge straps 44 and 49 eliminate the possibility of coin, contained within carrier 4, jamming the hinge connections and preventing proper operation of doors 46.

The runner-like strip members 52 mounted on the outer surfaces of door closure walls 47 have V-shaped projecting formations 56 adapted to engage the inner surfaces of pneumatic tubes 3 or 3a during travel of a carrier 4 through the tubes to hold the doors 46 closed in event that the doors accidentally become unlatched or improperly latched during such travel.

The location and arrangement of the latch mechanism for the doors of the improved carrier construction also is important. The latch slides 38, as indicated, are mounted directly on the heavy base plates 22 independently of the side columns 23 of the carrier shell 21. Further, the mounting and operation of the latch slides 38 do not require any openings or apertures to be formed extending through the carrier shell 21 which if present could weaken the shell.

The direct mounting of the latch slides 38 on the base plates 22 prevents impairment of the latching function which can arise through any flexing of the side columns 23 due to impact, in event latch mechanisms were mounted on side columns 23 of shell 21. Also, latch slides 38 are movable crosswise of the carrier 4 rather than lengthwise thereof. This avoids any possibility of movement of latch slides 38, which could cause accidental unlatching, incident to inertia of a movable latch part when a carrier is suddenly stopped. This could occur if the latch slides 38 were movable lengthwise of carrier 4.

Finally, no portion of latch slides 38, nor of any member connected thereto, projects beyond the free ends of the carrier and cushions 34 of carrier 4, or beyond the periphery of the cushions 34 or accelerating discs 33. This avoids any possibility of unintentional actuation of the latch mechanism as carrier 4 travels through pneumatic tubes 3 or 3a or when carrier 4 strikes a stop abutment at either terminal station of the equipment.

Referring to FIGS. 13, 14 and 15, the modified construction illustrated involves pivoting the accelerating disc 33 and cushion end member 34 on one end of the carrier. This is accomplished by pivotally mounting swivel plate 57 on a shouldered headed pivot bolt 58 threaded at 59 centrally into carrier mounting plate 24 at one end of the carrier.

A pair of guide and stop pins 60, preferably headed shouldered bolts, mounted at 61 on mounting plate 24 are received in arcuate recessed slots 62 formed in swivel plate 57 to limit the swivel movement of plate 57 with respect to mounting plate 24. The accelerating disc 33 and cushion end member 34 are mounted by bolts 63 on swivel plate 57.

The pivoting of swivel plate 57 on plate 24 permits the long axis of the oval shape of accelerating disc 33 and cushion end member 34 carried by swivel plate 57 to rotate with respect to the fixed accelerating disc 33 and end member 34 at the other end of the carrier 4, to a position such as shown by dotted lines in FIG. 13.

A carrier equipped with the described swivel-end construction can turn in a sharper twist 12 (FIG. 1) formed in pneumatic tube 3 in a shorter distance than a carrier not equipped with the swivel construction. Normally, approximately 30 feet in length of pneumatic tube 3 is required in order to provide a 180° twist which can be traversed by a carrier having fixed ends. A carrier with a swived-end construction can traverse a 180° twist in about one-half such tube length, or in other words, in about 15 feet.

Thus, the improved swivel-end construction for carriers of oval shape enables a pneumatic tube system to be installed under conditions where space limitations otherwise would render installation difficult.

Accordingly, the present invention provides new pneumatic system carrier and tube constructions which minimize damage to carrier and carrier components in use; in which a carrier may present a bottom hinged door for access at a station at either end of a system with the stations oriented in any desired direction relative to one another; with which station orientation requirements may be satisfied with shorter tube lengths than heretofore possible; and with which ready installation and accessibility of pneumatic tube systems with sealed joints between tube sections may be obtained; and provides for satisfying the manifold requirements indicated, for eliminating difficulties heretofore encountered in the art, and for achieving the indicated objects in a simple, effective and inexpensive manner.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example and the scope of the invention is not limited to the exact structures illustrated or described, because these may be changed to provide other physical structures without departing from the fundamental principles of the invention.

Thus, the construction of the carrier shell has been illustrated and described as being fabricated from base plates, mounting plates and column members welded together and having a particular relationship to achieve base plate and column member rigidity for resisting shock. It is to be understood, however, that the carrier shell can be formed as a casting or forging of a metal having the required strength, such as high strength aluminum or magnesium alloys, and having the same configuration and relationship between the column and end members of the shell to obtain the advantages described.

Having now described the features, discoveries and principles of the invention, the assembly, operation and use of preferred forms thereof, and the advantages, new and useful results obtained thereby; the new and useful discoveries, principles, apparatus, combinations, parts, elements, subcombinations, arrangements, constructions, and interrelationships between components, and mechanical equivalents obvious to those skilled in the art are set forth in the appended claims.

We claim:

1. A pneumatic tube carrier including a rectangular carrier shell formed of spaced rigid side column members and spaced base plate means; the column members each having ends, inner and outer faces extending between the ends, the inner faces being flat, and the column members having a varying cross-sectional thickness between inner and outer faces; the base plate means having portions joined with and extending between the inner faces of the column members and other portions joined with and extending across the ends of the column members to provide a stable, rigid, integral, elongated, box-like shell structure open at each side; first door means hinged at one end to one of said base plate means adapted to close one open side of said rectangular shell; second door means hinged at one end to the other base plate means adapted to close the other open side of said rectangular shell; means urging each door means to open position; and latch means for each door means mounted on the base plate means normally holding such door means latched in closed position against the action of said door opening urging means, 2. The construction defined in claim 1 in which the base plate means are mortised into the inner faces of the column members adjacent the column member ends.

3. The construction defined in claim 1 in which each column member is provided with a mortise in its inner face adjacent each column member end; in which each base plate means includes a base plate having ends and a mounting plate; in which the ends of each plate extend into mortises at corresponding ends of said column members and welds along the base plate ends join the base plate ends and mortises; and in which each mounting plate is welded to its adjacent base plate and extends across and is welded to corresponding ends of said column members.

4. The construction defined in claim 1 in which each of said first and second door means comprises a generally flat, rectangular closure wall and flange-like side walls projecting from the closure wall; in which the door means when closed have their side walls aligned and telescoped within the carrier shell adjacent the column member inner faces; in which the base plate means have inner faces; and in which said door means closure and side walls and said base plate inner faces form an elongated, box-like, payload-containing compartment.

5. The construction defined in claim 4 in which the door means side walls have end edges adjacent the hinged ends of the door means; and in which spring-pressed plungers are mounted in the spaced base plate means engaging said door side wall and edges for urging the door means to open position.

6. The construction defined in claim 1 in which each base plate means has an inner face; in which each door means is hinged to a base plate means by piano-type hinge means including a hinge pin; and in which each hinge pin is located below the inner face of the corresponding base plate means.

7. The construction defined in claim 1 in which the latch means for each door means includes a latch slide movable on a baseplate means; in which each door means has a swinging edge having a projecting ear adapted to be engaged by the latch slide for such door means; and in which each latch slide is spring-pressed to latching position and slidably movable parallel with the swinging edge of the door means latched thereby crosswise of the carrier shell.

8. The construction defined in claim 1 in which the spaced base plate means comprises first and second base plate means; in which each base plate means has two edge faces and an inner compartment-forming face; in which first door latch means is mounted on one edge face and second door hinge means is mounted on the other edge face of said first base plate means; in which second door latch means is mounted on one edge face and first door hinge means is mounted on the other edge face of said second base plate means; in which said door hinge means comprise piano-type hinges having hinge pins located below the compartment-forming face of the corresponding base plate means; and in which said latch means comprise spring-pressed latch slides engageable with corresponding door means and movable crosswise of the carrier shell.

9. The construction defined in claim 1 in which an accelerator disc and an end cushion are mounted on the base plate means at each end of the carrier; and in which the mounting of the accelerator disc and end cushion on one end of the carrier is a swivel mounting.

10. The construction set forth in claim 9 in which the accelerator discs and end cushions at the ends of the carrier are generally oval in shape, whereby the carrier may move back and forth in an oval-section carrier tube and the swivel mounting of the accelerator disc and end cushion at one end of the carrier permits carrier travel in such carrier tube through sharply twisted sections of such tube.

References Cited by the Examiner

UNITED STATES PATENTS

| 2,912,066 | 11/1959 | Ellithorpe | 243—34 |
| 2,934,285 | 4/1960 | Niehaus | 243—34 |
| 3,059,875 | 10/1962 | Kelley | 243—35 |
| 3,080,136 | 3/1963 | Kelley | 243—34 |

FOREIGN PATENTS

| 1,103,852 | 3/1961 | Germany. |
| 1,117,497 | 11/1961 | Germany. |

SAMUEL F. COLEMAN, *Primary Examiner.*

ANDRES H. NIELSEN, *Examiner.*